US012785004B2

(12) United States Patent
Gietzold et al.

(10) Patent No.: US 12,785,004 B2
(45) Date of Patent: Nov. 3, 2026

(54) AIRCRAFT SOLID STATE POWER CONTROLLER AND METHOD OF MONITORING THE TEMPERATURE OF A SOLID STATE SWITCH IN AN AIRCRAFT SOLID STATE POWER CONTROLLER

(71) Applicant: HS Elektronik Systeme GmbH, Nördlingen (DE)

(72) Inventors: Thomas Gietzold, Unterwilflingen (DE); Gerd Michael Kluger, Ederheim (DE); Markus Greither, Augsburg (DE); Joshua C. Swenson, Rockford, IL (US); Nhia Yang, Roscoe, IL (US); Robert C. Cooney, Janesville, WI (US); Francis Belisle, Beloit, WI (US); Charles Shepard, DeKalb, IL (US)

(73) Assignee: HS ELEKTRONIK SYSTEME GMBH, Nordlingen (DE)

( * ) Notice: Subject to any disclaimer, the term of this patent is extended or adjusted under 35 U.S.C. 154(b) by 354 days.

(21) Appl. No.: 18/493,227

(22) Filed: Oct. 24, 2023

(65) Prior Publication Data

US 2024/0145190 A1 May 2, 2024

(30) Foreign Application Priority Data

Oct. 28, 2022 (EP) .................................... 22204393

(51) Int. Cl.
*H01H 11/00* (2006.01)
*H01H 71/12* (2006.01)

(52) U.S. Cl.
CPC ...... *H01H 11/0062* (2013.01); *H01H 71/123* (2013.01); *B64D 2221/00* (2013.01); *H01H 2011/0068* (2013.01)

(58) Field of Classification Search
CPC ............. H01H 11/0062; H01H 71/123; H01H 2011/0068; B64D 2221/00;
(Continued)

(56) References Cited

U.S. PATENT DOCUMENTS 5,640,293 A 6/1997 Dawes et al.
6,052,268 A 4/2000 Thomas
(Continued)

FOREIGN PATENT DOCUMENTS

CN 114153165 A 3/2022
EP 3840213 A1 6/2021
(Continued)

OTHER PUBLICATIONS

Abstract of CN114153165 (A), Published: Mar. 8, 2022, 1 page.
European Search Report for Application No. 22204393.7, mailed Apr. 3, 2023, 7 pages.

*Primary Examiner* — John E Breene
*Assistant Examiner* — Manuel Salvador Castellon, Jr.
(74) *Attorney, Agent, or Firm* — CANTOR COLBURN LLP

(57) ABSTRACT

A method of monitoring the temperature of a solid state switch in an aircraft solid state power controller. The method includes: measuring an electric current (I) flowing through the solid state switch; calculating, based on the measured electric current (I), an introduced electric power ($P_{el}$) that is introduced into the solid state switch within the predefined time period ($\Delta t$); calculating an increase in temperature ($\Delta T$) of the solid state switch that is caused by the introduced electric power ($P_{el}$); calculating an actual temperature ($T_{act}$) of the solid state switch by adding the calculated increase in temperature ($\Delta T$) to an ambient temperature ($T_{amb}$); and comparing the calculated actual temperature ($T_{act}$) with a predefined temperature threshold ($T_{th}$) and determining an
(Continued)

overheat condition if the calculated actual temperature ($T_{act}$) exceeds the predefined temperature threshold ($T_{th}$).

15 Claims, 2 Drawing Sheets

(58) Field of Classification Search
CPC ... H03K 2017/0806; H03K 2217/0027; H03K 17/0822; H02H 7/008; H02H 5/041
See application file for complete search history.

(56) References Cited

U.S. PATENT DOCUMENTS

| | | | | |
|---|---|---|---|---|
| 6,125,024 A | | 9/2000 | Lecomte et al. | |
| 7,508,642 B2 | | 3/2009 | Ye | |
| 7,869,178 B2 | | 1/2011 | Gayowsky et al. | |
| 8,320,090 B2 | | 11/2012 | Rozman et al. | |
| 9,263,877 B1 | * | 2/2016 | Kellogg | G01K 7/22 |
| 10,193,331 B2 | | 1/2019 | Kilroy et al. | |
| 10,587,146 B2 | | 3/2020 | Qian et al. | |
| 2008/0043393 A1 | * | 2/2008 | Petkov | H02H 5/041 361/103 |
| 2010/0046123 A1 | | 2/2010 | Fukami | |
| 2010/0134024 A1 | | 6/2010 | Brandes | |
| 2011/0134587 A1 | | 6/2011 | Schnetker et al. | |
| 2015/0138681 A1 | * | 5/2015 | Mayes | H02H 1/0007 361/93.7 |
| 2023/0003765 A1 | * | 1/2023 | Baronian | G01R 19/0023 |
| 2024/0072717 A1 | * | 2/2024 | Nagarale | H02P 29/68 |
| 2024/0372546 A1 | * | 11/2024 | Shi | H02H 3/08 |

FOREIGN PATENT DOCUMENTS

| | | |
|---|---|---|
| GB | 2297439 A | 7/1996 |
| WO | 2021104670 A1 | 6/2021 |

* cited by examiner

AIRCRAFT SOLID STATE POWER CONTROLLER AND METHOD OF MONITORING THE TEMPERATURE OF A SOLID STATE SWITCH IN AN AIRCRAFT SOLID STATE POWER CONTROLLER

CROSS REFERENCE TO RELATED APPLICATIONS

This application claims priority to European Patent Application No. 22204393.7 filed Oct. 28, 2022, the entire contents of which is incorporated herein by reference.

TECHNICAL FIELD

The present invention is related to an aircraft solid state power controller and to a method of monitoring the temperature of a solid state switch in an aircraft solid state power controller. The present invention is further related to an aircraft comprising an aircraft solid state power controller according to an exemplary embodiment of the invention.

BACKGROUND

Modern aircraft usually comprise at least one aircraft power controller, in particular an aircraft solid state power controller ("SSPC"), for controlling the supply of electric power from an electric power supply to at least one electric load within an aircraft. Aircraft solid state power controllers usually comprise solid state switches for switching the supply of electric power from the electric power supply to the at least one electric load.

In cause of a malfunction, an excessively large electric current may flow through a solid state switch causing overheating, which may result in damaging the solid state switch and/or electric wires, which are connected to the solid state switch.

It therefore would be beneficial to provide a convenient method of monitoring the temperature of a solid state switch in an aircraft solid state power controller in order to prevent the solid state switch reliably from overheating.

SUMMARY

According to an exemplary embodiment of the invention, a method of monitoring the temperature of a solid state switch in an aircraft solid state power controller comprises the steps of: measuring an electric current flowing through the solid state switch; calculating, based on the measured electric current an introduced electric power that is introduced into the solid state switch; calculating an increase in temperature of the solid state switch that is caused by the introduced electric power; calculating an actual temperature of the solid state switch by adding the calculated increase in temperature to an ambient temperature of the solid state switch; comparing the calculated actual temperature with a predefined temperature threshold and determining an overheat condition if the calculated actual temperature exceeds the predefined temperature threshold. The method may further include issuing an electric alarm signal when an overheat condition is determined.

Exemplary embodiments of the invention further include an aircraft solid state power controller comprising a solid state switch for selectively switching an electric current; an ammeter for measuring the electric current flowing through the solid state switch during the predefined time period; and a calculator that is configured for: calculating an introduced electric power that is introduced into the solid state switch by the measured electric current; calculating a increase in temperature of the solid state switch that is caused by the introduced electric power; calculating an actual temperature of the solid state switch by adding the calculated increase in temperature to an ambient temperature of the solid state switch; comparing the calculated actual temperature with a predefined threshold temperature and determining an overheat condition if the calculated actual temperature exceeds the predefined temperature threshold. An electric alarm signal may be issued when an overheat condition is determined.

A method of monitoring the temperature of a solid state switch in an aircraft solid state power controller and an aircraft solid state power controller according to exemplary embodiments of the invention allow reliably monitoring the temperature of a solid state switch in an aircraft solid state power controller. By deactivating the solid state switch in case an overheat condition is detected, damaging the solid state switch due to overheating, which is caused by an excessive electrical current flowing through the solid state switch, may be prevented.

Monitoring the temperature of a solid state switch according to exemplary embodiments of the present invention may be implemented in addition to a conventional circuit breaker for providing a redundant over current detection. This may enhance the safety of the aircraft electrical system.

A method of temperature monitoring according to exemplary embodiments of the invention may also be used independently of an over current detection for providing predictive health monitoring.

The determined temperatures and rates of change of temperatures may provide system information indicating degeneration or just starting degeneration of the solid state switch, which may not be detected by a simple over current detection.

Temperature monitoring according to exemplary embodiments of the present invention may provide a leading indicator for high amperage power connections, such as bolted joints, being degraded and having higher voltage drops, which are below the voltage drop limit that affects the actual system operation.

The SSPC function protection approach according to exemplary embodiments of the present invention may be advantageous for the higher amperage and voltage levels required for electric propulsion where the criticality of the SSPC component is higher than just normal aircraft electrical power loads.

A combined control approach combining monitoring a detected current and the temperature, which is determined according to the present invention, allows the solid state power switch to be set active to control for temperatures of functions to protect not only wiring but the device itself from over temperature faults, which are not caused directly by high amperage. This may be beneficial for implementing secondary control methods, in particular for power levels of several hundreds of kW, since damage to an aircraft wiring/harness insulation can happen long before the wire breaks due to the electric current.

The increase of the temperature of the solid state switch may be proportional to the square of the measured electric current. The increase of the temperature of the solid state switch may in particular by calculated by multiplying the square of the measured electric current with a factor $R_{th-el}$, which includes the electric resistance Rel and the thermal impedance $Z_{th}$ of the solid state switch.

Said factor $R_{th\text{-}el}$, which is parameter of the respective solid state switch, may be taken from a data sheet of the respective solid state switch. Alternatively, it may be calculated from the physical and geometrical properties of the solid state switch, or it may be determined experimentally.

The method may include measuring the ambient temperature with an ambient temperature sensor. The ambient temperature sensor may be configured for measuring the temperature of ambient air in the vicinity of the solid state switch. The ambient temperature sensor may also be configured for measuring the temperature of a support, such a (printed) circuit board, to which the solid state switch is mounted. The ambient temperature sensor may further be configured for measuring the temperature in the vicinity of electric cable, which are connected to the solid state switch.

Measuring the ambient temperature with an ambient temperature sensor allows determining the actual temperature of the solid state switch with high accuracy even in environments in which the ambient temperature may considerably change and damage to the cable can happen long before the actual failure of the cable.

The method may further include calculating a change in the temperature of the solid state switch over the predefined time period and determining an overheat condition if the calculated change of the temperature exceeds the predefined temperature threshold. This allows for an early detection of malfunctions of the SSPC, which may cause an unusual fast increase of the temperature of the solid state switch, even if the temperature of the solid state switch has not exceeded the given temperature threshold yet. The method may include issuing an electric alarm signal when an overheat condition is determined.

The method may include triggering the activation of a cooling system when an overheat condition has been determined, in order to limit the temperature of the solid state switch and preventing the solid state switch from being damaged due to overheating.

In order to prevent a premature activation of the cooling system due to accidental short peaks in the calculated temperature, the method may include activating the cooling system only after an overheat condition has been determined for at least a predefined cooling system activation of time.

The method may include switching off the solid state switch, when the overheat condition has been determined in order to prevent the solid state switch from being damaged due to overheating.

In order to prevent an premature shutting off the of the solid state switch due to accidental short peaks in the calculated temperature, the method may include switching off the solid state switch only after the overheat condition has been determined for at least a predefined shut-off of time.

The method may in particular include activating the cooling system after a first electric alarm signal has been issued, and shutting off the solid state switch after a second electric alarm signal has been issued. The first electric alarm signal may indicate that the calculated actual temperature of the solid state switch exceeds a first predefined temperature threshold, and the second electric alarm signal may indicate that the calculated actual temperature of the solid state switch exceeds a second predefined temperature threshold. The second predefined temperature threshold may in particular be larger than the first predefined temperature threshold.

The method may also include activating the cooling system after an overheat condition has been determined, and shutting down the solid state switch if the overheat condition is still determined after a predetermined amount of time indicating that the temperature of the solid state switch did not drop below the predefined temperature threshold although the cooling system has been activated.

The thermal power that is dissipated from the solid state switch during the predefined time period may be considered to be constant over the predefined period of time. The thermal power that is dissipated from the solid state switch during the predefined time period may be a function of the ambient temperature, which may be considered to be constant over the predefined period of time.

The thermal power that is dissipated from the solid state switch during the predefined time period will, however, change when the cooling system is activated and deactivated. In consequence, in case a cooling system is present, two different constant values indicating the amount of thermal power that is dissipated from the solid state switch may be used depending on whether the cooling system is switched on or off.

Alternatively, in order to enhance the accuracy of the calculated actual temperature of the solid state switch, the thermal power that is dissipated from the solid state switch during the predefined time period may be a function of the temperature of the solid state switch during the predefined time period and/or of the ambient temperature during the predefined time period.

If the thermal power that is dissipated from the solid state switch during the predefined time period changes considerably during the predefined time period, the actual temperature of the solid state switch may be calculated in recursive steps or by integration over the predefined time period in order to enhance the accuracy of the calculated actual temperature.

The solid state switch may be a field effect transistor (FET), in particular a metal-oxide-semiconductor field-effect transistor (MOSFET). Field effect transistors, in particular metal-oxide-semiconductor field-effect transistors, provide reliable electric switches, which are able to switch high voltages and large currents within short periods of time. Field effect transistors and metal-oxide-semiconductor field-effect transistors have a long lifetime and are available at reasonable costs. The solid state switch may also be an insulated-gate bipolar transistor (IGBTs.)

Exemplary embodiments of the invention also include an aircraft, in particular an airplane, which is equipped with an aircraft electric power supply system including an aircraft electric power supply, an electric load, and an aircraft solid state power controller according to an exemplary embodiment of the invention. The aircraft solid state power controller is configured for controlling the supply of electric power from the aircraft electric power supply to the electric load.

BRIEF DESCRIPTION OF THE FIGURES

In the following, an exemplary embodiment of an aircraft ground fault detection circuit will be described is described in more detail with reference to the enclosed figures.

DETAILED DESCRIPTION

Figure 1:
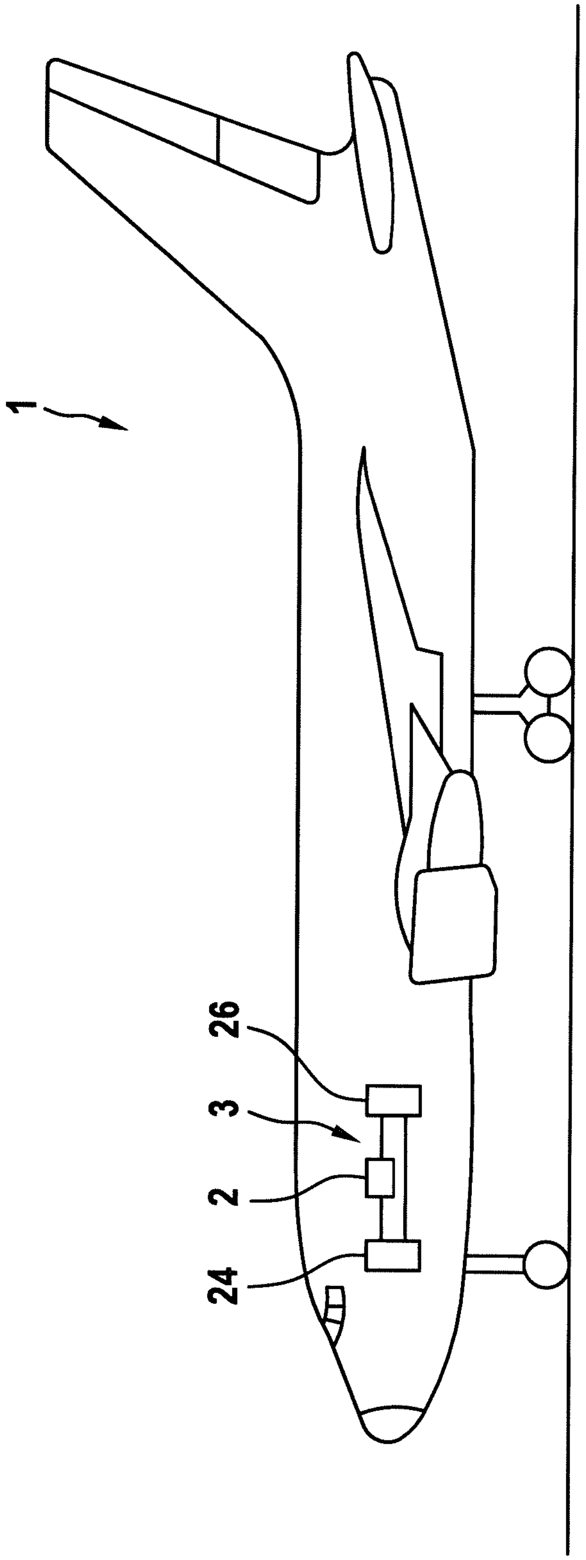
FIG. 1 depicts a schematic side view of an aircraft comprising an aircraft electric power supply system including an aircraft solid state power controller (SSPC) according to an exemplary embodiment of the invention.

FIG. 1 shows an aircraft 1, in particular an airplane, which is equipped with an aircraft electric power supply system 3 including an aircraft electric power supply 24, an electric load 26, and an aircraft solid state power controller (SSPC) 2 according to an exemplary embodiment of the invention, which is configured for controlling the supply of electric power from the aircraft electric power supply 24 to the electric load 26.

Although the aircraft electric power supply system 3 depicted in FIG. 1 includes only a single aircraft electric power supply 24, a single electric load 26, and a single SSPC 2, respectively, alternative embodiments of aircraft electric power supply system 3 may comprise more the one of each of said components, respectively.

An aircraft electric power supply system 3 may in particular include a plurality of SSPCs 2, wherein each SSPC 2 includes numerous SSPC channels.

Figure 2:
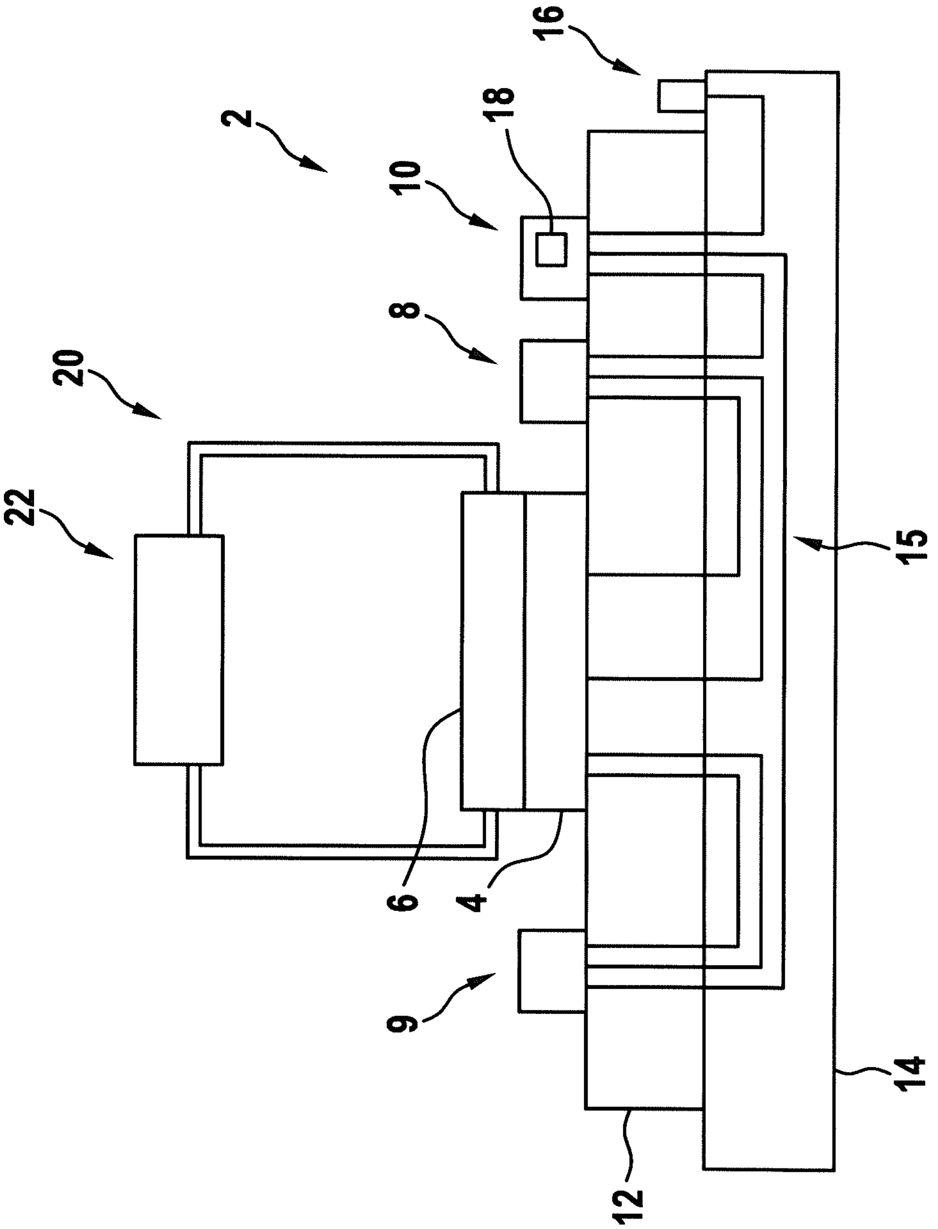
FIG. 2 depicts a schematic sectional view of a portion of an SSPC 2 according to an exemplary embodiment of the invention.

FIG. 2 depicts a schematic view of a portion of an SSPC 2 according to an exemplary embodiment of the invention.

The SSPC 2 comprises a solid state switch 4 for selectively switching the electric load 26 (see FIG. 1), which is not depicted in FIG. 2. The solid state switch 4 may be a field effect transistor (FET), in particular a metal-oxide-semiconductor field effect transistor (MOSFET), or an insulated-gate bipolar transistor (IGBT).

The SSPC 2 may comprise further components, in particular electric circuitry for driving the solid state switch 4. These additional components are not explicitly depicted in FIG. 2.

The solid state switch 4 is mounted to a support 14, for example to a printed circuit board, which not only mechanically supports the solid state switch 4 and potential additional electric components for driving the solid state switch 4, but which further provides electric connections to the solid state switch 4 by conductive paths 15 formed on or within the printed circuit board. A layer providing an insulating interface 12 may be formed between the solid state switch 4 and the support 14. The layer 12 providing the insulating interface 12 may be provided with conductive patterns on its side facing the solid state switch 4 for allowing direct copper bonding ("DCP") of the solid state switch 4 to the support 14.

The solid state switch 4 is further provided with a heat sink 6, which is configured for enhancing the dissipation of thermal energy from the solid state switch 4. The heat sink 6 may be a passive heat sink 6, in particular a cooling element, which provides an extended heat dissipation surface for dissipating heat from the solid state switch 4 to ambient air.

Alternatively, the heat sink 6 may be an active heat sink 6, i.e. a heat sink 6 that is part of a cooling system 20, which allows for actively cooling of the solid state switch 4. The cooling system 20 may, for example, comprise a fluid cooling medium, such as water or air, which may be circulated through the heat sink 6 and an external heat exchanger 22 for dissipating heat from the solid state switch 4.

The SSPC 2 also comprises an ammeter 8 for measuring the size of the electric current I flowing through the solid state switch 4. Optionally, the SSPC 2 may further comprise a voltage meter 9 for measuring the voltage drop ΔU over the solid state switch 4. If the voltage drop ΔU over the solid state switch 4 or the electric resistance R of the solid state switch 4, in a state in which the solid state switch 4 is switched on, are constant and known, the voltage meter 9 may be omitted.

The SSPC 2 further comprises a calculator 10, which is configured for calculating the current temperature T(t) of the solid state switch 4 from the electric current I flowing through the solid state switch 4, and, optionally, from the voltage drop ΔU over the solid state switch 4. An example of a method for calculating the current temperature T(t) of the solid state switch 4 from the electric current I flowing through the solid state switch 4 is described in the following:

The introduced electric power Pel(t), i.e. the electric power Pel that is introduced into the solid state switch 4 at a given time t, when the measured electrical current I(t) is flowing through the solid state switch 4, may be calculated from the measured electrical current I(t) and the voltage drop ΔU(t) over the solid state switch 4 (Pel=I*ΔU). Alternatively, the introduced electric power Pel may be calculated from the measured electrical current I and the electric resistance Rel of the solid state switch 4 (Pel=Rel*I2).

At least a portion of the introduced electric power Pel is dissipated from the solid state switch 4 via the direct copper bonding and/or the heat sink 6. A calculated net power Pcalc(t) at a time t is obtained by subtracting the dissipated thermal power $P_{diss}(t)$ at the time t from the introduced electric power $P_{el}(t)$:

$$P_{calc}(t)=P_{el}(t)-P_{diss}(t)$$

The calculated net power Pcalc(t) at the time t is the net thermal power that is introduced into the solid state switch 4 and which causes an increase of the temperature T of the solid state switch 4.

The change of temperature ΔT=T(t1)−T(t0) of the solid state switch 4 during a given time interval [t1, t0] is proportional to the integral of the calculated net power $P_{calc}(t)$ over said given time interval $[t_1, t_0]$:

$$\Delta T([t_1,t_0])=(1/C_{th})\int P_{calc}(t)dt$$

$$\Delta T([t_1,t_0])=(1/C_{th})\int(P_{el}(t)-P_{diss}(t))dt$$

with $$P_{el}(t)=Rel*I^2(t), \text{ and}$$

$$P_{diss}(t)=(\mathbf{1}/Z_{th})(T(t)-T(t_0)).$$

In these equations, Rel is the electric resistance, $Z_{th}$ is the thermal impedance, and Cth is the heat capacity of the solid state switch 4.

When the electric current $(I(t)=I_{const})$ is constant during the time interval $[t_1, t_0]$, the integral over time may be solved analytically, and the change of temperature ΔT may be calculated as $$\Delta T([t_0,t_1])=T(t_1)-T(t_0)=R_{el}*I^2_{const}Z_{th}(1-\exp[-t_1/(Z_{th}*C_{th})]).$$

After the thermal equilibrium has been reached $(t_1\rightarrow\infty)$, the increase of temperature ΔT(t) over the ambient temperature, which is caused by the electric current I, is constant over time ΔT(t)=ΔT=const, and the above equation simplifies to:

$$\Delta T=R_{el}*I^2_{const}*Z_{th}, \text{ or}$$

$$\Delta T=R_{th\text{-}el}*I^2_{const}$$

with $R_{th\_el}=R_{el}*Z_{th}$.

Thus, the increase of temperature ΔT of the solid state switch 4, which is caused by the electric current I in operation, is given by the product of the square of the (constant) electric current $I_{const}$ flowing through the solid state switch 4, and a proportionality constant $R_{th\text{-}el}$, which is a function, in particular the product, of the electric resistance $R_{el}$ and the thermal impedance $Z_{th}$ of the solid state switch 4.

The proportionality constant Rth-el is an intrinsic constant parameter of the respective solid state switch 4, which may be taken from a data sheet provided by the manufacturer of the respective solid state switch 4. Alternatively, the proportionality factor Rth-el may be calculated from the physical and geometrical properties of the solid state switch 4, or it may be determined experimentally.

After the increase of the temperature ΔT, which is caused by the electric current flowing through the solid state switch 4, has been determined, as it has been described before, the actual temperature $T_{act}$ of the solid state switch 4 may be calculated by adding the calculated increase of the temperature ΔT to the ambient temperature $T_{amb}$:

$$T_{act}=T_{amb}+\Delta T$$

The ambient temperature $T_{amb}$ may be measured by an ambient temperature sensor 16, which may be located in the vicinity of, but spatially separated from, the solid state switch 4. The ambient temperature sensor 16 may, for example, be mounted to the support 14 of the solid state switch 4, as it is depicted in FIG. 2.

The ambient temperature sensor 16 may be configured for measuring the temperature Tair of ambient air in the vicinity of the solid state switch 4 as the ambient temperature Tamb. Alternatively, the ambient temperature sensor 16 may be configured for measuring the temperature Tsupp of the support 14 of the solid state switch 4 as the ambient temperature Tamb.

In yet another embodiment, the calculated increase of the temperature ΔT may be added to an ambient temperature T'amb that is measured not in the vicinity of the solid state switch 4 but in another portion of the aircraft 100, for example in the vicinity of electric cables, which are electrically connected to the solid state switch 4.

The calculator 10 may comprise a comparator 18, which is configured for comparing the calculated actual temperature Tact of the solid state switch 4 with a predefined threshold temperature Tth and for determining an overheat condition if the calculated actual temperature Tact exceeds the predefined threshold temperature Tth. An electric alarm signal may be issued, when an overheat condition has been determined.

Determining an overheat condition may cause the solid state switch 4, an external switch (not shown), which may be arranged between the solid state switch 4 and the electric power supply 24, or the electric power supply 24 itself to shut-off in order to interrupt the flow of electric current through the solid state switch 4 for preventing a further increase of the temperature T of the solid state switch 4. A further increase of the temperature T of the solid state switch 4 beyond the predefined threshold temperature Tth, may cause damage to the solid state switch 4.

In order to avoid that the solid state switch 4, the external switch and/or the electric power supply 24 are undesirably switched off because the calculated actual temperature Tact of the solid state switch 4 exceeds the predefined threshold temperature Tth only temporarily for a short period of time, the solid state switch 4, the external switch and/or the electric power supply 24 may be switched off only after the calculated actual temperature Tact of the solid state switch 4 has exceeded the predefined threshold temperature Tth for at least a predefined shut-off time Δtshut-off.

In an alternative embodiment, the comparator 18 may be configured for determining an overheat condition only after the calculated actual temperature Tact of the solid state switch 4 has exceeded the predefined threshold temperature Tth for at least the predefined shut-off time Δtshut-off.

Alternatively, an active cooling system 20, which is thermally connected to the heat sink 6, may be activated after the overheat condition has been determined for actively dissipating heat from the heat sink 6 and the solid state switch 4.

In order to avoid a premature activation of the cooling system 20 and/or an oscillating operation of the cooling system 20 between an activated state and a deactivated state, the cooling system 20 may be activated only after the overheat condition has been determined for at least a predefined cooling system activation time 66 tcool.

In an embodiment comprising an active cooling system 20, it is also possible that two different threshold temperatures Tth1 and Tth2 are defined.

In such an embodiment, the cooling system 20 may be activated when the calculated actual temperature Tact exceeds a first threshold temperature Tth1, in particular for at least the predefined cooling system activation time Δtcool, and the solid state switch 4, the external switch or the electric power supply 24 may be shut-off when a second threshold temperature Tth2, which is set higher than the first threshold temperature Tth1 (Tth2>Tth1) has been exceeded, in particular for at least the predefined shut-off time Δtshut-off.

Activating the cooling system 20 may be sufficient for preventing the solid state switch 4 from overheating. In such a case, shutting off the solid state switch 4 may be avoided. The solid state switch 4, however, will be shut off in order to prevent thermal damage of the solid state switch 4, in case activating the cooling system 20 is not sufficient for cooling the solid state switch 4 enough so that its temperature does not exceed the second threshold temperature Tth2.

An unusual rapid increase of the temperature Tact(t) of the solid state switch 4 may indicate a malfunction of the SSPC 2, even if a predefined absolute threshold temperature Tth is not (yet) exceeded.

In order to detect such a kind of malfunction, the calculator 10 may be configured for calculating a change Tact of the current temperature Tact of the solid state switch 4 over time. The calculated change Tact of the current temperature Tact over time may, for example, be the derivative T'=dTact/dt of the current temperature Tact(t1) with respect to time t. Alternatively, the calculated change Tact of the current temperature Tact over time may be a change ΔT of the current temperature Tact(t) over a predefined time period Δt=[t0, t1].

The calculator 10 may further be configured for determining an overheat condition and causing the solid state switch 4, the external switch and/or the electric power supply 24 to shut off, if the calculated change T'act(t) of the temperature exceeds a predefined threshold T'th.

Calculating and monitoring the change T'act(t) of the current temperature Tact(t) of the solid state switch 4 provides an additional way of detecting a potential malfunction of the SSPC 2. In consequence, the safety of operating the SSPC 2 is further enhanced.

While the invention has been described with reference to an exemplary embodiment, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention is not limited to the particular embodiment disclosed, but that the invention will include all embodiments falling within the scope of the appended claims.

The invention claimed is:

1. A method of monitoring the temperature of a solid state switch in an aircraft solid state power controller, the method comprising the steps of:

measuring an electric current (I) flowing through the solid state switch;

calculating, based on the measured electric current (I) an introduced electric power (Pel) that is introduced into the solid state switch;

calculating a net thermal power (Pcalc) that is introduced in to the solid state switch by subtracting a dissipated thermal power (Pdiss) from the introduced electric power (P);

calculating an increase in temperature (ΔT) of the solid state switch that is caused by the net thermal power (Pcalc);

calculating an actual temperature ($T_{act}$) of the solid state switch by adding the calculated increase in temperature (ΔT) to an ambient temperature ($T_{amb}$); and comparing the calculated actual temperature ($T_{act}$) with a predefined temperature threshold ($T_{th}$) and determining an overheat condition if the calculated actual temperature ($T_{act}$) exceeds the predefined temperature threshold ($T_{th}$); and activating with the power controller a cooling system or switching off the solid state switch with the power controller after the overheat condition has been determined.

2. A method according to claim 1, wherein the method includes measuring the ambient temperature ($T_{amb}$) with a temperature sensor.

3. A method according to claim 1, wherein the increase in temperature (ΔT) of the solid state switch is determined by multiplying the square of the measured electric current (I) with a factor $R_{th-el}$, which depends on the electric resistance Rel and the thermal impedance $Z_{th}$ of the solid state switch 4.

4. A method according to claim 1, wherein the method further includes calculating a rate of the change of the temperature (T') of the solid state switch and determining an overheat condition of the rate of the change of the temperature (T') over the predefined time period (Δt) exceeds a predefined threshold ($T'_{th}$).

5. A method according to claim 1, wherein the method includes switching off the solid state switch when the overheat condition has been determined for at least a predefined shut-off time ($\Delta t_{shut\text{-}off}$).

6. A method according to claim 1, wherein the method includes activating the cooling system, when the overheat condition has been determined, in particular when the overheat condition has been determined for at least a predefined period of cooling system activation time ($\Delta t_{cool}$).

7. A method according to claim 1, wherein the thermal power ($P_{diss}$) that is dissipated from the solid state switch during the predefined time period (Δt) is a function of the temperature of the solid state switch during the predefined time period (Δt) and/or of the ambient temperature ($T_{amb}$) during the predefined time period (Δt).

8. An aircraft solid state power controller comprising:

a solid state switch for selectively switching an electric current (I);

an ammeter for measuring the electric current (I) flowing through the solid state switch;

a calculator that is configured for:

calculating an introduced electric power (Pel) that is introduced into the solid state switch by the measured electric current (I);

calculating a net thermal power (Pcalc) that is introduced in to the solid state switch by subtracting a dissipated thermal power (Pdiss) from the introduced electric power (P);

calculating an increase in temperature (ΔT) of the solid state switch that is caused by the net thermal power (Pcalc);

calculating an actual temperature ($T_{act}$) of the solid state switch by adding the calculated increase in temperature (ΔT) to an ambient temperature ($T_{amb}$);

comparing the calculated actual temperature ($T_{act}$) with a predefined threshold temperature ($T_{th}$) and determining an overheat condition if the calculated actual temperature ($T_{act}$) exceeds the predefined threshold temperature ($T_{th}$); and activating with the power controller a cooling system or switching off the solid state switch with the power controller after the overheat condition has been determined.

9. An aircraft solid state power controller according to claim 8, further comprising a temperature sensor for sensing the ambient temperature ($T_{amb}$).

10. An aircraft solid state power controller according to claim 8, wherein the solid state switch is mounted to a PCB, and wherein the ambient temperature ($T_{amb}$) is the temperature of the PCB.

11. An aircraft solid state power controller according to claim 8, wherein the increase of the temperature (ΔT) of the solid state switch is determined by multiplying the square of the measured electric current (I) with a factor $R_{th-el}$, which depends on the electric resistance Rel and the thermal impedance $Z_{th}$ of the solid state switch 4.

12. An aircraft solid state power controller according to claim 8, wherein the aircraft solid state power controller is configured for calculating a rate of a change of the temperature (T') of the solid state switch and for determining an overheat condition if the rate of the change of the temperature (T') over the predefined time period (Δt) exceeds a predefined threshold ($T'_{th}$).

13. An aircraft solid state power controller according to claim 8, wherein the aircraft solid state power controller is configured for switching off the solid state switch when the overheat condition has been determined for at least a predefined shut-off time ($\Delta t_{shut\text{-}off}$).

14. An aircraft solid state power controller according to claim 8, wherein the aircraft solid state power controller is configured for activating the cooling system when the overheat condition has been determined for at least a predefined cooling system activation time ($\Delta t_{cool}$).

15. An aircraft comprising an aircraft electric power supply system including an aircraft power controller according to claim 8.

* * * * *